Nov. 10, 1970  G. J. FARRELL  3,538,738
HIGH ENERGY RATE MACHINES
Filed June 22, 1967  4 Sheets-Sheet 1

INVENTOR
GERALD J. FARRELL

Nov. 10, 1970    G. J. FARRELL    3,538,738
HIGH ENERGY RATE MACHINES
Filed June 22, 1967    4 Sheets-Sheet 2

INVENTOR
GERALD J. FARREL

BY Marzall, Johnston, Cook & Root

ATTYS.

United States Patent Office 3,538,738
Patented Nov. 10, 1970

3,538,738
HIGH ENERGY RATE MACHINES
Gerald J. Farrell, Elmhurst, Ill., assignor to U.S. Industries, Inc., New York, N.Y., a corporation of Delaware
Filed June 22, 1967, Ser. No. 647,985
Int. Cl. B21j 7/24
U.S. Cl. 72—436            18 Claims

ABSTRACT OF THE DISCLOSURE

A high energy rate machine wherein the machine is fired by releasing latching mechanism to thereby free the piston for movement.

---

This invention relates to high energy rate machines.

It is a primary object of the present invention to afford a novel high energy rate machine.

It is another object of the present invention to afford a novel latching mechanism, which is particularly well adapted for use in high energy rate machines, and the like.

Another object of the present invention is to afford a novel actuator for use in high energy rate machines.

High energy rate machines have been heretofore known in the art. However, such high energy rate machines as have been heretofore known in the art have commonly had several inherent disadvantages, such as, for example, being so constructed that the drive pistons of the actuator portions thereof have been subject to back pressure during a driving actuation, thus reducing the efficiency of the unit; requiring seals effective to prevent the high pressure working fluid from prematurely drivingly engaging the driving pistons of the machine when the machines were cocked and ready to fire; requiring platens of undesirably great length; requiring elaborate coring and machining of the platens thereof; requiring the cylinders thereof to be made of tool steel because of the impact stresses to which they were subjected; being difficult to fire in a balanced manner when the machine embodied more than one cylinder; being complicated in construction and operation; or being difficult and expensive to manufacture, and the like. It is an important object of the present invention to overcome such disadvantages.

Another object of the present invention is to enable a novel high energy rate machine to be afforded, which requires no seals between the drive pistons and the gas used to drive them.

Another object is to afford a novel high energy rate machine wherein two platens may be reciprocated toward and away from each other in a novel and expeditious manner.

Yet another object of the present invention is to enable a novel high energy rate machine to be afforded which embodies a plurality of drive pistons, and wherein the parts of the machine are constituted and arranged in a novel and expeditious manner effective to insure balanced firing of the machine.

A further object is to afford a novel high energy rate machine wherein the drive pistons thereof, at all times, are subjected to the driving pressure of the gas in the driving cylinders thereof.

Another object of the present invention is to afford a novel high energy rate machine wherein the drive pistons are held in cocked position, prior to firing, in a novel and expeditious manner.

An object ancillary to the foregoing is to enable the drive pistons of such a machine to be mechanically latched in such cocked position.

One of the problems heretofore common in mechanically latching rams or pistons, which are driven at the high speeds involved in high energy rate machines, and the like, has been to afford a latching mechanism which reliably held such pistons, and, yet, on release, was fast enough acting that it would withdraw into fully released position without dragging or scraping across a surface of the ram or piston, or of other moving parts associated therewith. As will be appreciated by those skilled in the art, such dragging or scraping across surfaces moving at the speeds which are common with the pistons of high energy rate machines, and the like, will produce scoring and even gouging of such surfaces.

It is an important object of the present invention to enable the high speeds rams of high energy rate machines, and the like, to be mechanically latched in a novel and expeditious manner.

Another object of the present invention is to afford a novel latching mechanism for mechanically latching the rams of high energy rate machines, and the like, in cocked position, and which latching mechanism is effective and reliable in its latching operation.

A further object is to afford a novel latching mechanism of the aforementioned type which is releasable from latching position in a novel and expeditious manner effective to quickly release the latching mechanism in a manner whereby it does not cause scoring or scraping of surfaces of the mechanism being released for actuation.

Another object is to afford a novel high energy rate machine of the aforementioned type and to afford a novel latching mechanism of the aforementioned type, both of which are efficient and reliable in operation, and may be readily and economically produced commercially.

Other and further objects of the present invention will be apparent from the following description and claims and are illustrated in the accompanying drawings which, by way of illustration, show the preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

A high energy rate machine 1, embodying the principles of the present invention, is shown in the drawings to illustrate the presently preferred embodiment of the present invention.

Figure 1:
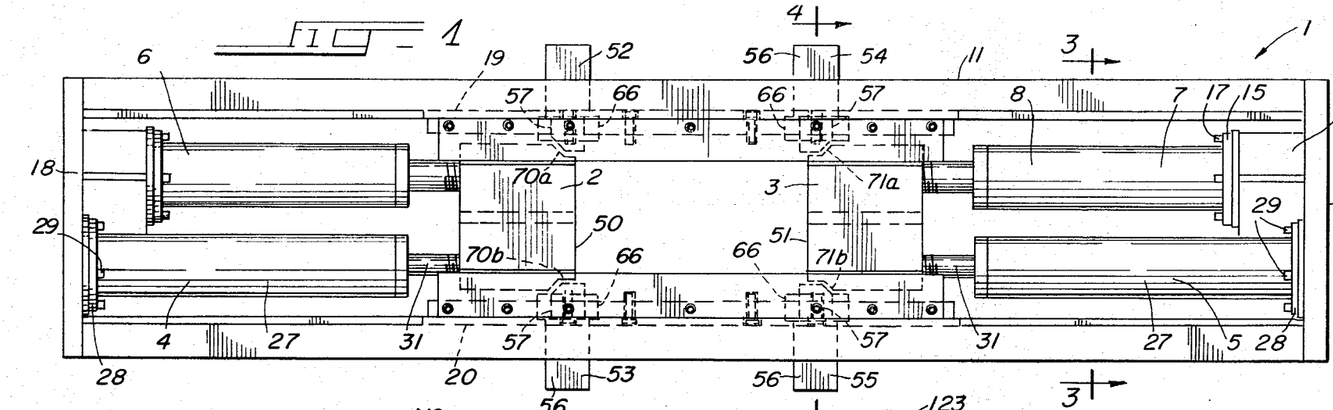
FIG. 1 is a front elevational view of a high energy rate machine embodying the principles of the present invention, with the machine turned ninety degrees in a vertical direction so that it is disposed in lying-down position.
Figure 2:
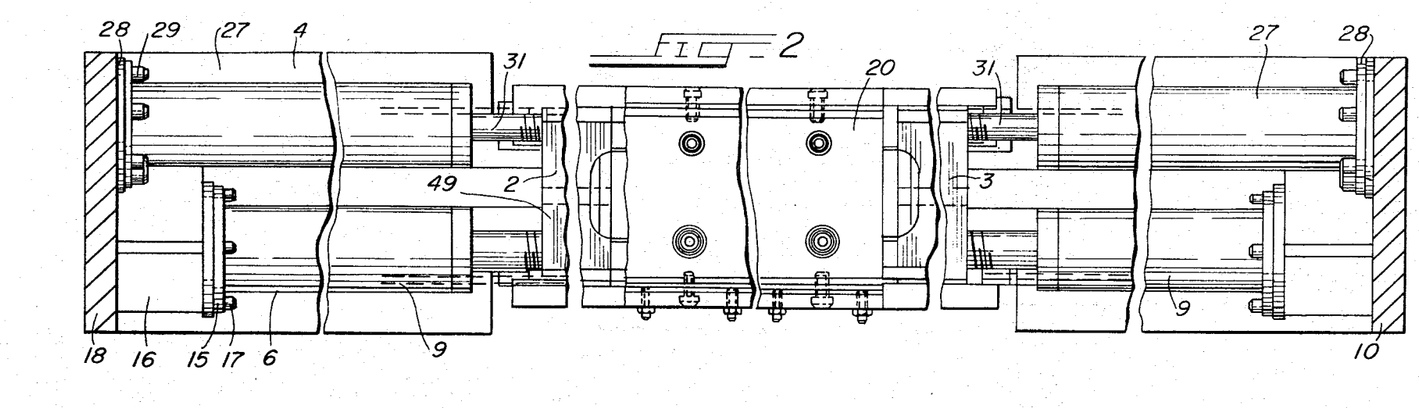
FIG. 2 is a somewhat enlarged, fragmentary side elevational view of the machine shown in FIG. 1, with the machine lying down as shown in FIG. 1.
Figure 3:
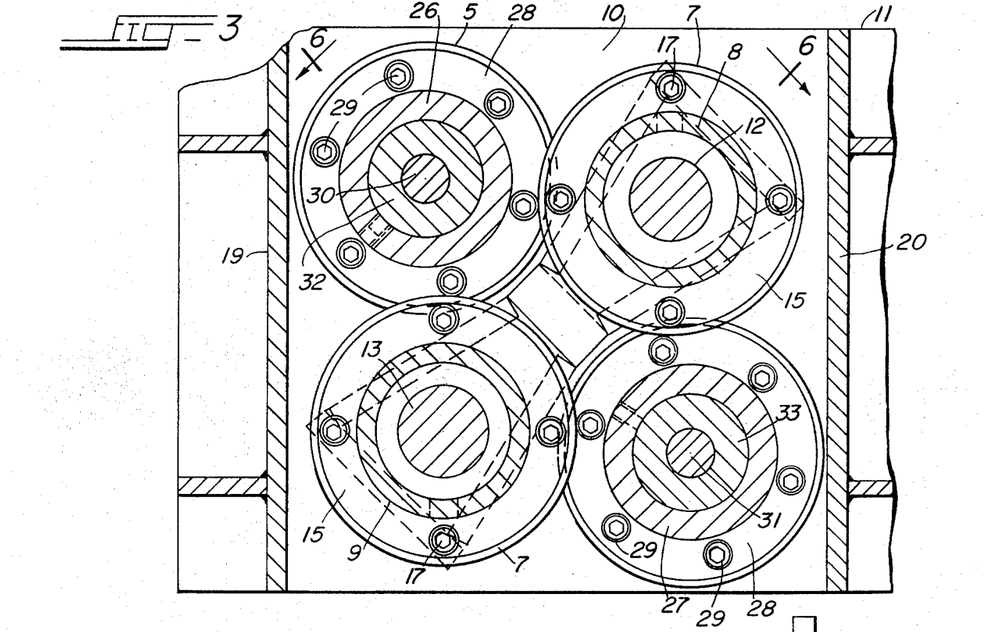
FIG. 3 is an enlarged, fragmentary, sectional view taken substantially along the line 3—3 in FIG. 1.

The machine 1 embodies, in general, FIGS. 1, 2 and 3, two opposed platens 2 and 3 which are moved apart by two return mechanisms 4 and 5, respectively, and are driven together by two drive mechanisms 6 and 7, respectively, during each cycle of operation of the machine 1.

Each of the return mechanisms 4 and 5 are identical in construction, and parts which are the same therein are indicated by the same reference numeral. Likewise the drive mechanisms 6 and 7 are identical in construction, and parts which are the same therein are indicated by the same reference numerals.

The lower drive mechanism 7 includes two charging cylinders or drive cylinders 8 and 9 mounted on the lower end wall 10 of the frame 11 of the machine 1, FIGS. 1, 2, and 3. Two drive pistons 12 and 13 are mounted in the cylinders 8 and 9, respectively, for vertical reciprocation therein, and the upper ends thereof are threadedly connected to the bottom 14 of the lower platen 3. Each of the cylinders 8 and 9 has an outwardly projecting flange 15 on the lower end thereof, and the cylinders 8 and 9 are secured to a mounting block 16, mounted on the bottom wall 10 of the frame 11, and are secured thereto by suitable fastening means such as bolts 17 extended through the flanges 15 into the mounting block 16.

Figure 4:
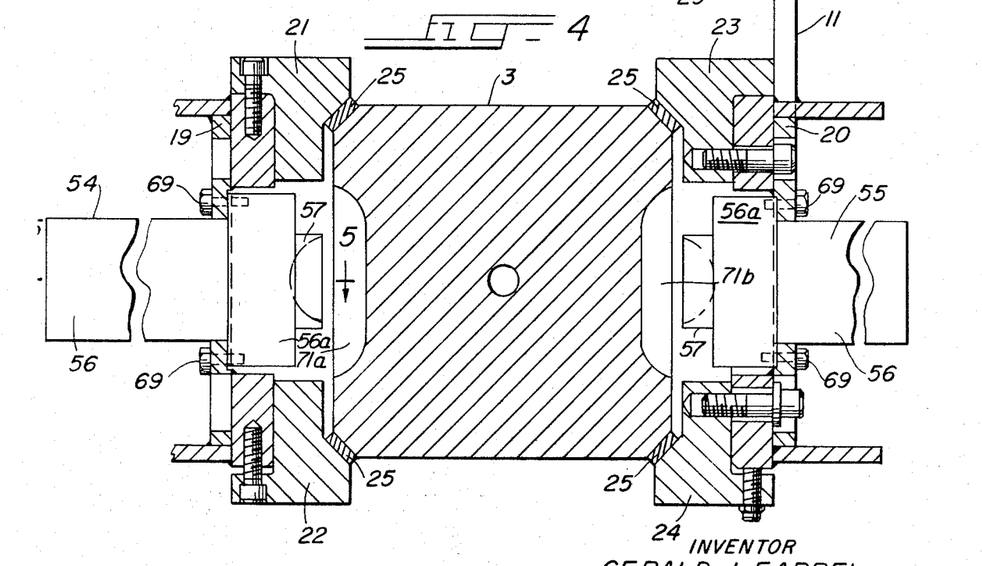
FIG. 4 is an enlarged, fragmentary, sectional view taken substantially along the line 4—4 in FIG. 1, but with the latching mechanisms shown in elevation.

The frame 11 of the machine 1 includes a top wall 18, which is disposed in substantially parallel relation to the bottom wall 10, FIGS. 1 and 2, and two side walls 19 and 20, FIGS. 1, 3, and 4, which extend between and are secured to the bottom wall 10 and the top wall 18 in substantially parallel relation to each other. The walls 10 and 18-20 of the frame 11 may be made of any suitable material such as, for example, steel, and may be secured together by any suitable means such as, for example, welding.

Two side rails 21 and 22 are adjustably secured to two respective longitudinal side edge portions of the side wall 19, and, similarly, two side rails 23 and 24 are adjustedly secured to respective longitudinal side edge portions of the side wall 20, FIG. 4. The side rails 21-24 extend longitudinally of the frame 11 and terminate at their upper and lower ends beyond the upper and lower extremes of travel of the platens 2 and 3, respectively.

Each of the side rails 21-24 preferably includes an inner facing member or gib 25, and the side rails 21-24 are so disposed in the frame 11 that the gib 25 of each of the side rails 21-24 engages a respective corner of each of the platens 2 and 3, with a snug, but freely slidable fit, as illustrated in FIG. 4 with respect to the platen 3. With the aforementioned construction of the side rails 21-24, the main body portion thereof may be made of relatively soft material, such as, for example, mild steel and the gibs 25 thereon may be made of substantially harder, wear-resistant material such as, for example case hardened steel or the like. The gibs 25 are preferably removably secured to the respective side rails 21-24 by suitable means such as, screws, not shown, so that they may be quickly and easily removed and replaced, as desired.

The lower return mechanism 5 includes two float cylinders 26 and 27, FIGS. 1, 2, and 3, each having an outwardly projecting flange 28 on one end thereof. The cylinders 26 and 27 of the return mechanism 5 are secured to the bottom wall 10 by suitable means such as bolts 29 extending through the respective flanges 28, the cylinders 26 and 27 projecting upwardly from the bottom wall 10 in substantially parallel relation to each other and to the drive cylinders 8 and 9 of the drive mechanism 7. The drive cylinders 8 and 9 and the float cylinders 26 and 27 are disposed at relative corners of a substantially square pattern on the bottom wall 10, with the drive cylinders 8 and 9 disposed substantially diagonally opposite each other, and with the float cylinders 26 and 27 disposed substantially diagonally opposite each other, FIG. 3.

Figures 5, 6:
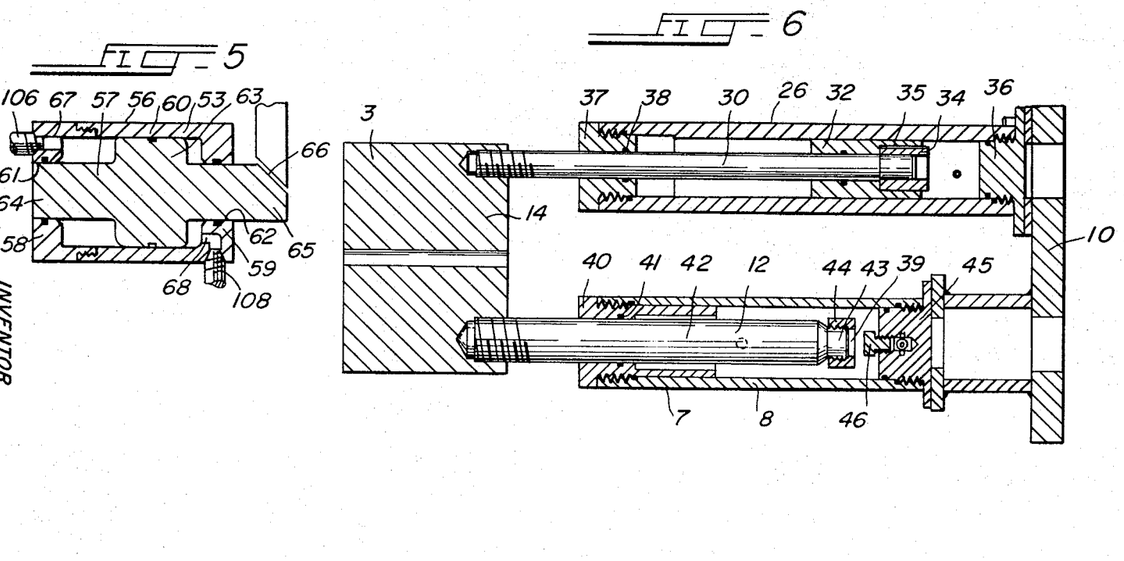
FIG. 5 is a longitudinal sectional view through a latch, taken substantially along the line 5—5 in FIG. 4.
FIG. 6 is a fragmentary detail sectional view taken substantially along the line 6—6 in FIG. 3.

The return mechanism 5 also includes two piston rods 30 and 31 reciprocably mounted in the float cylinders 26 and 27, respectively, with two floating pistons or floats 32 and 33, reciprocably mounted on the piston rods 30 and 31, respectively, FIGS. 3 and 6. Each of the piston rods 30 and 31 has an enlarged head 32 on one end thereof, FIG. 6. The enlarged heads 34 on the piston rods 30 and 31 are disposed in the cylinders 26 and 27, respectively, and afford retainer members, engageable with the floats 32 and 33 for limiting movement of the floats 32 and 33 downwardly with respect to the piston rods 30 and 31 of the lower return mechanism 5. The other ends of the piston rods 30 and 31 of the lower return mechanism 5 are threadedly secured to the bottom 14 of the platen 3, FIGS. 1, 2, and 6, so that they are reciprocable with the platen 3 and the pistons 12 and 13 of the lower drive mechanism 7.

The floats 32 and 33 of the lower drive mechanism 5 are disposed in the respective float cylinders 26 and 27, with a relative snug, freely slidable liquid-sealing fit, and each preferably has a recess 35 in the lower end thereof, FIG. 6, for receiving the head 34 on the piston rods 30 and 31, respectively. The heads 34 on the piston rods 30 and 31 are preferably of such outside diameter that they are spaced inwardly from the inner faces of the side walls of the respective float cylinders 26 and 27, for a purpose which will be discussed in greater detail presently.

Each of the float cylinders 26 and 27 of the lower return mechanism 5 is closed at its lower end by a suitable end wall 36, and at its upper end by a suitable end wall 37, FIG. 6. Preferably, the end walls 36 and 37 are in the form of plugs threaded into the ends of the cylinders 26 and 27, and are sealed therein in liquid-tight relation thereto. The piston rods 30 and 31 extend through, and are slidably mounted in, the end walls 37 of the respective cylinders 26 and 27, and the connection between the piston rods 30 and 31 and the respective end walls 37 are sealed against the passage of working fluid therebetween by suitable means such as packing rings 38.

Each of the drive cylinders 8 and 9 of the lower drive mechanism 7 is also closed at its lower end by a suitable end wall 39 and at its upper end by a suitable end wall 40, FIG. 6. Like the end walls 36 and 37, the end walls 39 and 40 are preferably in the form of plugs threaded into the respective ends of the drive cylinders 8 and 9 in sealed relation thereto. The drive pistons 12 and 13 in the respective drive cylinders 8 and 9 extend through and are slidably mounted in respective end walls 40, and the connection therebetween is sealed against the leakage of working fluid therebetween by suitable means such as packing rings 41.

In the preferred form of the present invention illustrated in the aforementioned drawings, each of the drive cylinders 12 and 13 embodies an elongated, substantially straight body portion 42, one end of which is threadedly engaged in the platen 3. The other end of the body portion 42 of each of the drive pistons 12 and 13 is disposed in the respective one of the cylinders 8 and 9, between the end walls 39 and 40 thereof, and includes a reduced end portion 43. A collar 44 is preferably threadedly mounted on the reduced end portion 43 in such position that it affords a recess 45 in the end of each of the drive pistons 12, axially outwardly of reduced end portion 43. The collars 44 are preferably of the same outside diameter as the main portions of the body portion 42 of the drive pistons 12 and 13 of which they form a part.

A metering pin 46 is mounted in each of the end walls 39 and projects into the respective drive cylinders 8 and 9 in such position that when the drive pistons 12 and 13 of the lower drive mechanism 7 are disposed in their lowermost positions the metering pins 46 extend into the recesses 45. The pins 46 are preferably so disposed, and of such size, that they are spaced from the drive pistons 12 and 13, both axially and radially, in all positions of the latter.

The upper return mechanism 4 and the upper drive mechanism 6 are identical in construction to the lower return mechanism 5 and the lower drive mechanism 7, respectively, except that the parts thereof are upside down, and the cylinders 26, 27, 8 and 9 thereof are secured to the top wall 18 of the machine frame 11. Therefore, it is not deemed necessary, for a proper understanding by those skilled in the art of the construction and operation of the machine 1, to illustrate and describe in detail the upper return mechanism 4 and the upper drive mechanism 6.

The upper return mechanism 4 is so disposed in the frame 11 that the cylinders 26 and 27 thereof are disposed in axial alignment with corresponding cylinders 26 and 27 of the lower return mechanism 5, with the flanges 28 thereon secured by bolts 29 to the lower face of the top wall 18, FIGS. 1 and 2, and with the piston rods 30 and 31 projecting downwardly from the respective cylinders 26 and 27, and threadedly secured to the top 49 of the platen 2.

Similarly, the flanges 15 on the drive cylinders 8 and 9 of the upper drive mechanism 6 are secured by bolts 17 to a mounting block 16 mounted on the lower face of the top wall 18 of the frame 11, with the drive cylinders 8 and 9 of the drive mechanism 6 projecting downwardly from the top wall 18 in axial alignment with the drive cylinders 8 and 9, respectively, of the lower drive mechanism 7. The drive pistons 12 and 13 mounted in the drive cylinders 8 and 9 of the upper drive mechanism 6 project downwardly therefrom and are threadedly secured to the top 49 of the platen 2.

In general, in the operation of the machine 1, the platens 2 and 3 are vertically reciprocated in the frame 11 between a fully retracted position, wherein the platen 2 is disposed in raised position and the platen 3 is disposed in lowered position, and a fully actuated position, wherein the platen 2 is disposed in lowered position and the platen 3 is disposed in raised position. With this construction when the platens 2 and 3 are disposed in retracted position, a work piece may be disposed therebetween and during operation of the machine 1, when the platens 2 and 3 move into actuated position, they are effective to stamp the work piece therebetween. Suitable dies, not shown, may be mounted on the lower face 50 of the platen 2 and on the upper face 51 of the platen 3 for forming the work piece into a desired configuration, when the platens 2 and 3 are brought together.

As will be discussed in greater detail hereinafter, in the operation of the machine 1, the platens 2 and 3 are moved from actuated position to retracted position by feeding hydraulic fluid into the inner ends of the float cylinders 26 and 27 of the upper and lower return mechanisms 4 and 5, to thereby force the floats 32 and 33 and, therefore, the piston rods 30 and 31 of the return mechanisms 4 and 5 outwardly into the outer end portions of their respective cylinders 26 and 27, such outward movement of the piston rods 30 and 31 being effective to move the platens 2 and 3 outwardly away from each other into fully retracted position. Subsequently, as will be discussed in greater detail presently, with the platens 2 and 3 held in the aforementioned retracted position, hydraulic fluid is fed into the outer ends of all of the float cylinders 26 and 27 to thereby force the floats 32 and 33 therein, respectively, inwardly into the inner ends of the respective float cylinders 26 and 27. Thereafter the platens 2 and 3 are freed for movement toward each other into fully actuated position, and gas pressure in the drive cylinders 8 and 9 of the upper and lower drive mechanisms 6 and 7, acting on the outer ends of the drive pistons 12 and 13, is effective to move the drive pistons 12 and 13, of the upper and lower drive mechanisms 4 and 5, and therefore, the platens 2 and 3 inwardly toward each other, into the aforementioned fully actuated position therefor. The movement of the platens 2 and 3 into actuated position, of course, is effective to move the piston rods 30 and 31 of the upper and lower return mechanisms 4 and 5, respectively, with them. Thus, it will be seen that each of the platens 2 and 3, together with the respective drive pistons 12 and 13 and piston rods 30 and 31 attached thereto, affords a ram, which is movable into work-performing relation to a work piece disposed between the platens 2 and 3. The piston rods 30 and 31 of the return mechanisms 4 and 5 being considerably smaller than the inside diameter of the respective float cylinders 26 and 27 in which they are mounted, relatively little resistance is afforded to the movement of the piston rods 30 and 31 through the hydraulic fluid in the cylinders 26 and 27.

In the operation of the machine 1, and prior to the firing thereof, when the platens 2 and 3 are disposed in retracted position, they are held in such position by latches 52 and 53, and 54 and 55, respectively, engaged therewith. When the machine 1 is to be fired, the latches 52–55 are retracted out of engagement with the platens 2 and 3 to thereby release the platens 2 and 3 for movement toward actuated position. With such construction of a machine, and, particularly a high energy rate machine of the nature of the machine 1, wherein the platens 2 and 3 accelerate to a velocity in the nature of 700 to 1000 inches per second in a stroke in the nature of 10 to 30 inches, the unlatching of the platens 2 and 3 poses a serious problem in that it must be accomplished in such a manner that the latches 52–55 are quickly moved into such position that they do not strike or scrape any part of the moving platen or associated parts. Dealing with the velocities involved in high energy rate machines of the aforementioned type, such unlatching poses a difficult problem. The machine 1 affords an effective solution to this problem.

The latches 52–53 are all identical in construction. Each of them embodies the construction of the latch 53 shown in substantial detail in FIG. 5, and like parts on all of the latches 52–53 are indicated in the drawings by the same reference numerals.

As shown in FIG. 5, the latch 53 includes a housing 56 having a piston 57 reciprocably mounted therein. The housing 56 includes a rear end wall 58 and a front end wall 59, with a substantially cylindrical-shaped side wall portion 60 extending therebetween. The end walls 58 and 59 have openings 61 and 62 extending therethrough, respectively, in axial alignment with each other. The piston 57 has an enlarged central portion 63 and two end portions 64 and 65 projecting in opposite directions from the central portion 63. The central portion 63 is disposed in the housing 56 between the end walls 58 and 59 and is engaged with the inner face of the side wall 60 with a liquid-tight, freely slidable fit. The end portions 64 and 65 of the piston 57 are reciprocably mounted in the openings 61 and 62, respectively, and are also engaged with the end walls 58 and 59, respectively, with a liquid-tight, freely slidable fit. The end portion 65 of the piston 57 has a beveled or tapered shoulder 66 formed on the free end portion thereof, for a purpose which will be discussed in greater detail presently. The end portion 65 of the piston 57 is preferably keyed to the end wall 59 of the housing 56 to prevent rotation of the piston 57 relative to the housing 56.

A passageway 67 is afforded in the rear end wall 58 for feeding hydraulic fluid into the housing 56 into the area behind the enlarged portion 63 of the piston 57, to thereby urge the piston 57 forwardly in the housing 56 into position to project the shoulder 66 forwardly of the housing 56 into latching position. Another passageway 68 is formed in the front wall 59 of the housing 56 for feeding a suitable gas, such as, for example, compressed nitrogen, into the housing 56 forwardly of the central portion 63 of the piston 57 to thereby urge the piston 57 rearwardly in the housing 56 into retracted position.

The housing 56 of each of the latches 52–55 includes a flange or collar 56a on the front end thereof, FIGS. 1 and 4. The housing 56 of the latches 52 and 54, and the housing 56 of the latches 53 and 55, extend through and are mounted in the side walls 19 and 20, respectively, of the frame 11 of the machine 1, with the flanges 56a thereon disposed in abutting engagement with the inner face of the adjacent respective side walls 19 and 20. The latches 52-55 may be secured in such position in the frame 11 by suitable means such as bolts 69 extending through the side walls 19 and 20 into the adjacent flanges 56a, FIG. 4.

The platen 2 has two beveled shoulders 70a and 70b formed on the lower edges of the respective side walls thereof disposed adjacent to the latches 52 and 53, FIG. 1, the shoulders 70a and 70b being so disposed that when the platen 2 is in the aforementioned retracted position, and the plungers 57 of the latches 52 and 53 are disposed in fully extended position, the shoulders 56 on the plungers 57 of the latches 52 and 53 are disposed in parallel, abutting engagement with the shoulders 70a and 70b, respectively, on the platen 2. In the operation of the machine 1, the latches 52 and 53 are held in such latching engagement with the platen 2 by the pressure of hydraulic fluid behind the central portion 63 of the plungers 57 thereof, as will be discussed in greater detail presently.

Similarly, the platen 3 has two shoulders 71a and 71b formed on the upper edges of the sides thereof adjacent the latches 54 and 55, respectively, FIGS. 1 and 4, and the shoulders 71a and 71b are engaged by the shoulders 66 on the plungers 57 of the latches 54 and 55, respectively, when the platen 3 is disposed in the aforementioned retracted position and the plungers 57 of the latches 54 and 55 are disposed in latching position. In the operation of the machine 1, hydraulic pressure behind the enlarged portiton 63 of the plunger 57 of the latches 54 and 55 is effective to hold the plungers 57 thereof in latching engagement with the shoulders 71a and 71b, to thereby hold the platen 3 in the aforementioned retracted position until the machine 1 is fired, as will be discussed in greater detail presently.

Figure 8:
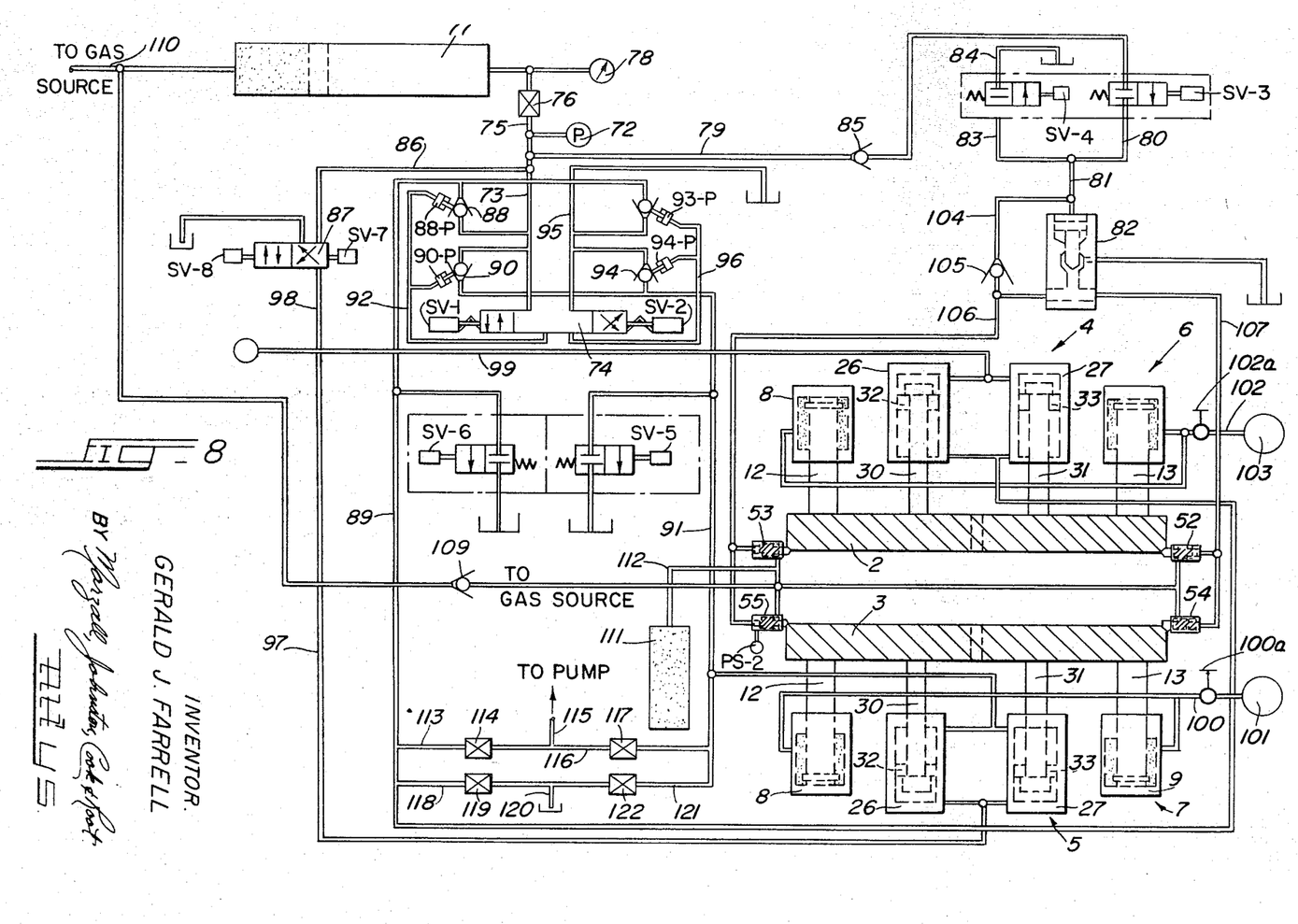
FIG. 8 is a schematic diagram of the hydraulic and pneumatic systems of the machine shown in FIG. 1.

Referring now to the hydraulic-pneumatic diagram of the machine 1 shown in FIG. 8, a hydraulic pump 72 is connected by a hydraulic line or conduit 73 to one side of a suitable solenoid operated, spring centered, four-way, three-position valve 74 embodying two solenoid valves SV-1 and SV-2. The hydraulic pump 72 is also connected by another hydraulic line 75 through a control valve 76 to an accumulator 77 and a suitable pressure gauge 78.

The hydraulic line 73 is connected through another hydraulic line 79 to one side of a solenoid valve SV-3, the other side of the solenoid valve SV-3 being connected by a hydraulic line 80 and a hydraulic line 81 to one side of a poppet valve 82. The poppet valve 82 is also connected through the hydraulic line 81 and another hydraulic line 83 to one side of a solenoid valve SV-4, the other side of the solenoid valve SV-4 being connected by a hydraulic line 84 to sump. A check valve 85 is embodied in the line 79 to prevent back flow of hydraulic fluid from solenoid valve SV-3 to the pump 72.

The hydraulic line 73 from the pump 72 is also connected by a hydraulic line 86 to one side of a solenoid operated, four-way, two-position valve 87 embodying two solenoid valves SV-7 and SV-8.

The hydraulic line 73, between the line 86 and the valve 74 is connected through a pilot-operated check valve 88 to a hydraulic line 89, and through another pilot-operated check valve 90 to a hydraulic line 91, for a purpose which will be discussed in greater detail presently. The check valves 88 and 90 are so disposed between line 73 and the lines 89 and 91, respectively, as to be normally effective to prevent the passage of hydraulic fluid from the hydraulic line 73 to the hydraulic lines 90 and 91, respectively. Another side of the valve 74 is connected by a hydraulic line 92 to the pilot valves 88-P and 90-P of the check valves 88 and 90, respectively, so that when the valve 74 is in position to feed hydraulic fluid from the line 73 through the line 92 to the pilot valves 88-P and 90-P, the check valves 88 and 90 are thereby opened to permit hydraulic fluid to flow from the hydraulic line 73 to the lines 89 and 91, respectively.

On the side of the check valves 88 and 90 remote from the hydraulic line 73, the hydraulic lines 89 and 91 are connected through solenoid valves SV-6 and SV-5, respectively, to sump, for a purpose which will be discussed in greater detail presently.

The lines 89 and 91 are also connected through pilot operated check valves 93 and 94, respectively, and a line 95 to sump. The check valves 93 and 94 are so disposed between the line 95 and the lines 89 and 91 that they are normally operable to prevent the passage of hydraulic fluid from the hydraulic lines 89 and 91, respectively, to the line 95. The other end of the line 95 is connected to one side of the valve 74. Another side of the valve 74 is connected through a hydraulic line 96 to the pilot valves 93-P and 94-P of the check valves 93 and 94, respectively, so that when the valve 74 is in position to feed hydraulic fluid from the line 73 to the line 96, and thus to the pilot valves 93-P and 94-P, the check valves 93 and 94 are opened to thereby permit the passage of hydraulic fluid from the lines 89 and 91, respectively, into the line 95 and thus to sump.

On the side of the solenoid valves SV-5 and SV-6 remote from the hydraulic pump 72, the hydraulic lines 89 and 91 are connected to the inner ends of the float cylinders 26 and 27 of the return mechanisms 4 and 5, respectively, for feeding hydraulic fluid thereinto inwardly of the respective floats 32 and 33. The outer ends of the float cylinders 26 and 27 of the return mechanism 5, outwardly of the floats 32 and 33 therein, are connected by a hydraulic line 97 to one side of the valve 87; and the outer ends of the float cylinders 26 and 27 of the return mechanism 4, outwardly of the floats 32 and 33 therein, are connected by a hydraulic line 99 and the hydraulic line 98 to the valve 87. A pressure switch PS-1 is connected to the junction of the hydraulic lines 97-99 for a purpose which will be discussed in greater detail presently.

The interiors of the drive cylinders 8 and 9 of the lower drive mechanism 7 are connected by a gas line 100 to a suitable source of pressurized gas, such as, for example, a tank of pressurized nitrogen 101. Similarly, the interiors of the drive cylinders 8 and 9 of the upper drive mechanism 6 are connected by a gas line 102 to a suitable supply of pressurized gas, such as, for example, a tank of pressurized nitrogen 103. The gas in the cylinders 8 and 9 of the upper and lower drive mechanisms 6 and 7 is at relatively high pressure, and affords the driving force for moving the platens 2 and 3 together from retracted position to activated position during operation of the machine 1, as will be discussed in greater detail presently.

The hydraulic line 81, which is connected at one end to the solenoid valves SV-3 and SV-4, is connected at its other end through a hydraulic line 104, embodying a check valve 105, to the side of the poppet valve 82 remote from the line 81. The check valve 105 is so disposed in the line 104 that it is effective to prevent reverse flow of hydraulic fluid from this latter side of the poppet valve 82 to the line 81. This latter side of the poppet valve 82 is connected by a hydraulic line 106 to the passageways 67 in the rear ends of the housings 56 of the latches 53 and 55, and by a hydraulic line 107 to the passageways 67 in the rear ends in the housings 56 of the latches 52 and 54.

The passageways 68 in the front ends of the housings 56 of the latches 52-55 are connected by a gas line 108, embodying a check valve 109 therein to the side of the accumulator 77 remote from the connection thereof to the hydraulic pump 72. The check valve 109 is so disposed in the hydraulic line 108 as to prevent flow from the latches 52-55 to the accumulator 77. The gas line 108 is connected to a suitable source of pressurized gas, not shown, by a gas line 110 for charging and maintaining the accumulator 77, the gas line 108 and the front ends of the housings 56 of the latches 52-55 with a suitable supply of gas under pressure. The gas source, not shown, for the latches 52–55 may be a tank of pressurized nitrogen, or other suitable pressurized gas, and the flow of such gas to the accumulator 77 and the gas line 108, and therefore, to the latches 52–55, may be controlled by any suitable controls, not shown, such as, for example, a manually operable shut-off valve in the gas line 110. A surge tank 111 is connected through a gas line 112 to the gas line 108, and, therefore, to the passages 68 in the front ends of the latches 52–55, and affords a sufficiently large volume of gas connected to the front ends of the latches 52–55 that the pressure of the gas on the plungers 57 of the latches 52–55 is substantially uneffected by reciprocation of the plungers 57 in the housings 56.

The hydraulic line 89, between the inner ends of the float cylinders 26 and 27 of the upper return mechanism 4 and the check valves 88 and 93, is connected through a hydraulic line 113 embodying a valve 114, and a line 115 to the hydraulic pump 72; and is connected by a hydraulic line 118, a valve 119 and a hydraulic line 120 to sump. Similarly, the hydraulic line 91 is connected through a a hydraulic line 116, embodying a valve 117, and the hydraulic line 115 to the hydraulic pump 72; and is connected through a hydraulic line 121, embodying a valve 122, and the hydraulic line 120 to sump. The valves 114, 117, 119, and 122 may be of any suitable type for controlling the opening and closing of the hydraulic lines 113, 116, 118, and 121, respectively, such as, for example, manually operated valves or remotely controlled solenoid valves, or the like. By operation of the valves 114, 117, 119, and 122 the platens 2 and 3 in the machine 1 may be inched toward and away from each other, as will be discussed in greater detail presently.

Figure 7:
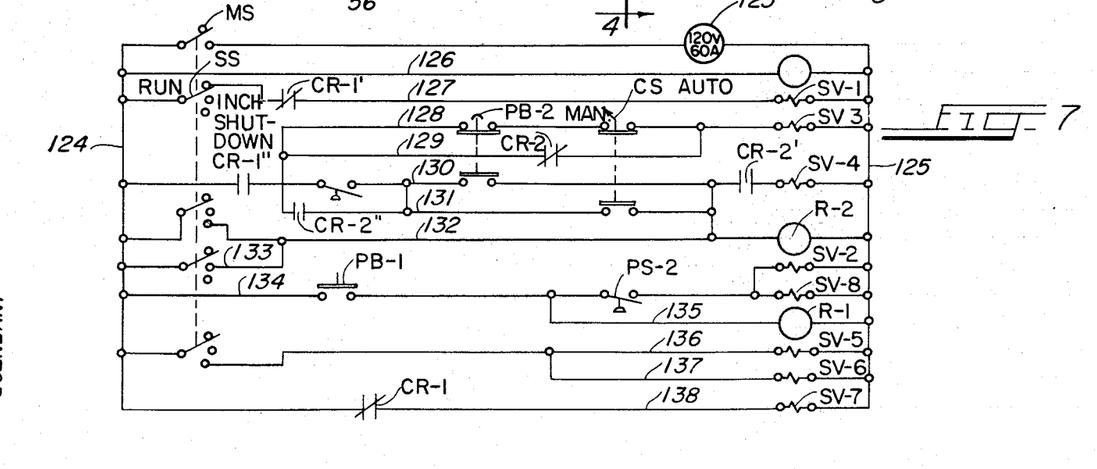
FIG. 7 is a schematic wiring diagram for the machine shown in FIG. 1.

Referring now primarily to the electrical wiring diagram shown in FIG. 7, and the hydraulic-pneumatic system diagram shown in FIG. 8, the operation of the machine 1 will be described. In FIG. 7, a suitable source of electrical power, such as, for example, a generator 123 is shown connected through a master switch MS to two main power lines 124 and 125, which are energized when the master switch MS is closed. Thirteen lines or circuits 126–138, respectively, are shown connected in parallel between the main power lines 124 and 125.

When the machine 1 is in fully shut down condition, the master switch MS is open and the selector switch SS, in lines 127, 132, 133, and 136 is disposed in "shut down" position. In the initial operation of the machine 1 it is necessary to charge the drive cylinders 8 and 9 of the drive mechanisms 6 and 7 with gas at the desired pressure. This may be accomplished by opening valves 102a and 100a in the gas lines 102 and 100, respectively, to thereby feed the aforementioned nitrogen or other suitable gas from the sources of supply 103 and 101 into the cylinders 8 and 9 of the drive mechanisms 6 and 7, respectively. When the pressure of the gas in the cylinders 8 and 9 of the drive mechanisms 6 and 7 is at the desired level, communication between the source of gas supply 103 and 101 the cylinders 8 and 9 may be shut off by closing the aforementioned valves 102a and 100a.

In the charging of the drive mechanism 6 and 7 it is desired to charge the cylinders 8 and 9 in the lower drive mechanism 7 at a slightly higher gas pressure than the cylinders 8 and 9 in the upper drive mechanism 6 to thereby afford a counterbalancing force effective to substantially overcome the imbalance afforded by the fact that the upper platen 2 moves downwardly and the lower platen 3 moves upwardly toward actuated position. For example, in a machine wherein each of the upper and lower rams, afforded by the platens 2 and 3 and associated parts, weighs 6,000 pounds, with the effective drive piston areas for each platen being 100 square inches, if the gas pressure in the fully charged cylinders 8 and 9 of the upper drive mechanism 6 is 2,000 pounds per square inch, the gas pressure in the fully charged cylinders 8 and 9 of the lower drive mechanism 7 preferably should be in the nature of 2,060 pounds per square inch.

During the initial charging of the drive cylinders 8 and 9 of the drive mechanisms 6 and 7, the upper platen 2 is disposed in fully lowered or actuated position at all times, and, through the action of the increasing gas pressure on the outer ends of the drive pistons 12 and 13 of the lower drive mechanism 7, the lower platen 3 is caused to move upwardly into fully actuated positon. After the initial charging of the drive cylinders 8 and 9 of the drive mechanisms 6 and 7, and as long as the gas pressure remains therein, when the machine 1 is in "shut down" condition, the platens 2 and 3 are held in the aforementioned actuated position, wherein they are clamped together, by the gas pressure in the drive cylinders 8 and 9 of the drive mechanisms 6 and 7.

In the initial cycle of operation of the machine 1, after the drive mechanisms 6 and 7 have been charged with gas in the aforementioned manner, the master switch MS is closed. This energizes the power lines 124 and 125. It also energizes solenoid valve SV–7 in the circuit 138, the normally closed relay contacts CR–1 in this circuit being closed at this time, FIG. 7. Energization of the solenoid valve CV–7 opens the connection from the outer ends of the float cylinders 26 and 27 in the lower return mechanism 5 through the hydraulic lines 97 and 98 and the valve 87 to sump, and also opens the connection from the outer ends of the float cylinders 26 and 27 of the return mechanism 4 through the hydraulic lines 99 and 98 and the valve 87 to sump, to thereby permit the outer ends of the float cylinders 26 and 27 in the return mechanisms 4 and 5 to drain to sump.

Thereafter, the selector switch SS may be moved from "shut down" position to "run" position, as shown in FIG. 7. Movement of the selector switch SS from "shut down" to "run" position de-energizes solenoid valves SV–5 and SV–6 in circuits 136 and 137, respectively, which were energized by the closing of the master switch MS with the selector switch SS disposed in the aforementioned "shut down" position. The solenoid valves SV–5 and SV–6 are normally closed valves and, therefore, the de-energization thereof, caused by the movement of the selector switch SS to "run" position causes them to close and thereby close the connection therethrough from the hydraulic lines 89 and 91 to sump. The valves SV–5 and SV–6 are closed at all times except when the master switch MS is closed and the selector switch SS is disposed in "shut down" position, at which time they are energized so as to insure that the hydraulic lines 89 and 91 are connected to sump, so as to insure that, during shut down, the hydraulic pump 72 will be ineffective to move the platens 2 and 3 to retracted position.

The aforementioned movement of the selector switch SS from "shut down" to "run" position is also effective to energize solenoid valve SV–1 in circuit 127, the normally closed relay contacts CR–1' in this circuit being closed at this time. Energization of the solenoid valve SV–1 feeds hydraulic fluid under pressure from the hydraulic pump 72 through the hydraulic line 73, the valve 74, and the hydraulic line 92 to the pilots 88–P and 90–P to thereby open the check valves 88 and 90, respectively. Opening of the check valves 88 and 90 causes hydraulic fluid to be fed from the pump 72 through the lines 73 and the check valves 88 and 90 into the hydraulic lines 89 and 91, respectively, and thus into the inner ends of the float cylinders 26 and 27 of the return mechanisms 4 and 5, respectively. The flow of hydraulic fluid into the inner ends of the float cylinders 26 and 27 of the return mechanisms 4 and 5 causes the floats 32 and 33 and the piston rods 30 and 31 in each of the respective cylinders 26 and 27 to move outwardly, and thus move the platens 2 and 3 outwardly away from each other into fully retracted position, against the urging of the gas in the drive cylinders 8 and 9 of the drive mechanisms 6 and 7.

It will be remembered that when the platens 2 and 3 are disposed in fully retracted position, the drive pistons 12 and 13 of the drive mechanisms 6 and 7 are disposed in their outermost position in their respective drive cylinders 8 and 9. In this position of the drive pistons 12 and 13 even in the preferred form of the machine 1 which embodies a metering pin 46 in the outer ends of each of the drive cylinders 8 and 9, FIG. 6, the entire outer end face of each of the drive pistons 12 and 13 is subjected to the pressure of the gas in the respective one of the cylinders 8 and 9, in which it is mounted. When the platens 2 and 3 are disposed in the aforementioned fully retracted position, the shoulders 70a–71b thereon are disposed directly opposite the shoulders 66 on the plungers 57 of the latches 52–55, respectively. However, at this point in a cycle of operation of the machine 1, when the platens 2 and 3 are initially disposed in fully retracted position, the latches 52–55 are also disposed in fully retracted postion, wherein they are disposed in laterally outwardly spaced relation to the adjacent side edges of the platens 2 and 3, and, therefore, are not effective to hold the platens 2 and 3, in retracted position. During this time the platens 2 and 3 are held in retracted position by the hydraulic pressure in the inner ends of the float cylinders 26 and 27.

After the platens 2 and 3 have thus been moved to fully retracted positions in the machine 1, the operator may manually close the push-button switch PB–1, and continue to hold it closed throughout the remainder of the cycle of operation of the machine 1, closing of the pushbutton switch PB–1 is effective to energize the relay R–1 in circuit 135. Energization of the relay R–1 energizes the solenoid valve SV–3 in circuit 128, the energization of the relay R–1 closing the normally open relay contacts C8–1" in circuit 130, and thus closing the circuit to solenoid valve SV–3 through the interconnected circuits 130, 129, and 128.

The energization of the solenoid valve SV–3 causes hydraulic fluid to be fed from the pump 72 through the hydraulic lines 73 and 79, the solenoid valve SV–3, and the hydraulic lines 80 and 81 to the upper end of the poppet valve 82, and thereby closes the poppet valve 82, to thus close the connection of the hydraulic lines 106 and 107 therethrough to sump. The closing of the poppet valve 82 thus closes the connection of the rear ends of the latches 52–55 to sump. The energization of the solenoid valve SV–3 also causes hydraulic fluid to be fed from the pump 72 through hydraulic lines 73 and 79, the solenoid valve SV–3, the hydraulic lines 80, 81, and 104, the check valve 105 and the hydraulic lines 106 and 107 to the outer ends of the latches 52–55, to thereby cause the shoulders 66 on the plungers 57 of the latches 52–55 to move into latching engagement with the shoulders 70a–71b, respectively, on the platens 2 and 3. In this position, the latches 52–55 are effective to firmly hold the platens 2 and 3 in fully retracted position.

The aforementioned energization of the relay R–1, caused by the manual closing of the push button switch PB–1, also opens the relay contacts CR–1 in the circuit 127, to thereby de-energize the solenoid valve SV–1. The de-energization of the solenoid valve SV–1 closes the connection between the hydraulic line 73 and the pilots 88–P and 90–P through the valve 74 and the hydraulic line 92 and opens the pilots 88–P and 90–P to sump through the hydraulic lines 92 and 95 and the valve 74, to thereby permit the check valves 88 and 90 to close, and thus shuts off the connection of the hydraulic pump 72 to the hydraulic lines 89 and 91, respectively. This is effective to close the connection between the hydraulic pump 72 and inner ends of the float cylinders 26 and 27 of both of the return mechanisms 4 and 5.

The aforementioned energization of the relay R–1 is also effective to open the relay contacts CR–1 in circuit 138 to thereby de-energize the solenoid valve SV–7. De-energization of the solenoid valve SV–7 closes the connection from float cylinder drain lines 97 and 99 through the hydraulic line 98 and the valve 87 to sump, so that at this point in the operation of the machine 1, both ends of all of the float cylinders 26 and 27 are closed against the passage of hydraulic fluid thereto and therefrom.

At this point in the operation of the machine 1, the platens 2 and 3 are in fully retracted position and effectively held in such position by the latches 52–55, with the gas in the drive cylinders 8 and 9 of the drive mechanisms 6 and 7 asserting its full effective force on the drive pistons 12 and 13 tending to urge the platens 2 and 3 toward each other. At this time, the pressure switch PS–2, FIGS. 7 and 8, connected to the outer ends of the latches 52–55 is moved to closed position by the pressure of the hydraulic fluid in the latches 52–55. The pressure switch PS–2 may be effective to close at any desired pre-determined pressure, such as, for example, 2,000 pounds per square inch.

Closing of the pressure switch PS–2 energizes the solenoid valve SV–2 in circuit 133 through the interconnection of the power lines 124 and 125 afforded by the circuits 134 and 133. Energization of the solenoid valve SV–2 causes hydraulic fluid to be fed from the hydraulic pump 72 through hydraulic line 73 and the valve 74 to the pilots 93–P and 94–P to thereby open the check valves 93 and 94, respectively. Opening of the check valves 93 and 94 connects the hydraulic lines 89 and 91, respectively, to the hydraulic line 95 and, therefore, to sump. This drains the inside ends of the fluid cylinders 26 and 27 of the return mechanisms 4 and 5 to sump, and thereby eliminates the force afforded thereby for holding the platens 2 and 3 against movement toward actuated position under the urging of the gas pressure in the drive cylinders 8 and 9 of the drive mechanisms 6 and 7. The platens 2 and 3 are now held in retracted position solely by the latches 52–55.

The aforementioned closing of the pressure switch PS–2 also energizes the solenoid valve SV–8 in circuit 134, the pushbutton switch PB–1 having been previously manually closed by an operator. The energization of the solenoid valve SV–8 actuates the valve 87 to thereby cause hydraulic fluid to be fed from the pump 72 through the hydraulic lines 73 and 86, the valve 87, the hydraulic line 98, and the hydraulic lines 97 and 99 to the outer ends of the float cylinders 26 and 27 of the return mechanisms 5 and 4, respectively. The hydraulic pressure thus exerted in the outer ends of the float cylinders 26 and 27 cause the floats 32 and 33 therein to be moved inwardly towards the platens 2 and 3 along the respective piston rods 30 and 31 into their normal at-rest position at the inner ends of the respective cylinders 26 and 27.

At this point in the operation of the machine 1 shown in the drawings, the machine is ready for firing to thereby cause the platens 2 and 3 to be moved together in a workpiece forming operation. Such firing of the machine 1 may be accomplished either manually or automatically, as will be discussed in greater detail presently.

A control switch CS, having contacts in circuits 128 and 131, FIG. 7 is embodied in the machine 1 for setting the machine for either manual or automatic firing operation. When the machine is set for manual operation, the control switch CS is disposed in such position that its contacts in circuit 128 are closed, and its contacts in circuit 131 are open. When the control switch is disposed in position for automatic operation, just the reverse is true, namely, its contacts in circuit 128 are open and its contacts in circuit 131 are closed.

With the control switch CS disposed in "automatic" operation position, firing of the machine 1 is effected by closing of a pressure switch PS–1 in circuit 130, the normally open relay contacts CR–1" now being closed because of the previous energization of the relay R–1 caused by the closing of the push button switch PB–1. The pressure switch PS–1 is connected to hydraulic lines 97 and 99, and closes at a predetermined hydraulic pressure on the outside of the floats 32 and 33 in the float cylinders 26 and 27 of the return mechanisms 4 and 5. The pressure at which the switch PS–1 closes may be any suitable pressure such as, for example 1800 pounds per square inch, and such pressure occurs in the outer ends of the float cylinders 26 and 27 after the floats 32 and 33 therein have bottomed on the inside ends thereof and the hydraulic pump 72 has built up the pressure in the float cylinders outwardly of the floats 32 and 33.

Closure of the pressure switch PS-1 energizes the relay R-2 in circuit 132 to thereby open a normally closed relay contact CR-2 in circuit 129, the circuit for energizing the relay R-2 extending from the power line 124 through the circuit 130, the lower contacts of the control switch CS in the circuit 131, and the circuit 132 to the power line 125. Opening of the relay contact CR-2 de-energizes the solenoid valve SV-3 to thereby close the connection between the hydraulic pump 72 and the poppet valve 82 through the hydraulic lines 73 and 79, the solenoid valve SV-3, and the hydraulic lines 80 and 81. The closing of the solenoid valve SV-3 also closes the connection therethrough from the pump 72 to the hydraulic line 104, the check valve 105 and the hydraulic lines 106 and 107. Thus, the closing of the solenoid valve SV-3 seals the hydraulic pump 72 from the poppet valve 79 and from the latches 52–55.

The aforementioned energization of the relay R-2 also closes the normally open relay contacts CR-2', in circuit 130, and the normally open relay contacts CR-2", in circuit 131. The closing of the relay contacts CR-2' and CR-2" energizes the solenoid valve SV-4, the circuit therefor extending from the power line 124 through the circuit 130, the contacts CR-2" in the circuit 131, and the contacts CR-2' in the circuit 130 to the power line 125. The energization of the solenoid valve SV-4 connects the hydraulic lines 81 and 83 therethrough to the hydraulic line 84, and thereby connects the upper end of the poppet valve 82 to sump. This permits the poppet valve 82 to open and thereby connect the outer ends of the latches 52–55 to sump through hydraulic lines 106 and 107 and the poppet valve 82.

The release of hydraulic pressure on the rear ends of the plungers 57 of the latches 52–55 permits the plungers 57 to move rearwardly in the respective housings 53, to thereby release the platens 2 and 3 for movement into actuated position, thus firing the machine. The operator may then release the push-button switch PB-1 to thereby permit it to return to fully raised position, as shown in FIG. 7, and this completes the automatic firing of the machine 1.

The aforementioned rearward movement of the plungers 57 in the latches 52–55 whereby the platens 2 and 3 are released, is preferably effected with such speed that they are withdrawn from latching engagement with the platens 2 and 3 in such a manner that no sliding or scraping contact occurs between the platens 2 and 3 and the latches 52–55. In the machine 1 disclosed herein, this may be effectively accomplished. According to my present theory, which is believed to be correct, the reason why the aforementioned effective release of the platens 2 and 3 by the latches 52–55 is accomplished in the machine 1 may be explained as set forth immediately below.

The aforementioned theory of operation is believed to be that at relatively high pressures on the hydraulic fluid in the latches 52–55, such as, for example, pressures of 3,000 pounds per square inch or more, as distinguished from lower pressures of 2,000 pounds per square inch, and the like, enough potential energy is stored in the oil that, in effect, when the rear ends of the latches 52–55 are opened suddenly to sump, by the quick opening of the poppet valve 82, the hydraulic fluid is permitted to expand. This additional energy available at the aforementioned higher pressures is sufficient to accelerate the hydraulic fluid to its terminal velocity at a rate which is sufficiently rapid to permit the plungers 57 to move rearwardly in the latch housings 53 sufficiently quickly to effect the complete release of the platens 2 and 3, even at the high rate of acceleration of the latter.

It will be remembered that the gas pressure on the front end of the plungers 57 of the latches 52–55 is preferably in the nature of 2,000 pounds per square inch. However, at the time of firing of the machine 1, the platens 2 and 3 are held in retracted position solely by the latches 52–55. The angle of bevel of the shoulders 66, on the latch plungers 57, and of the shoulders 70a–71b on the platens 2 and 3 are preferably such that, when the platens 2 and 3 are so held by the latches 52–55, they exert an axial force thereon sufficient to raise the pressure on the hydraulic fluid in the latches 52–55 to 4,000 pounds per square inch. Thus, at the instant of opening of the poppet valve 82, the pressure on the hydraulic fluid in the latching system is well in excess of that necessary to afford the rapid acceleration of the fluid to its terminal velocity, and thereby effect the aforementioned quick withdrawal of the latch plungers 57 to their fully retracted positions.

Upon such release of the platens 2 and 3 of the machine 1, each of them is substantially instantaneously accelerated to a velocity of several hundred inches per second. Preferably, in a high energy rate machine, such as the machine 1, the velocity attained by each of the platens 2 and 3 during its firing stroke is not substantially less than 500 inches per second and not substantially more than 1000 inches per second, and preferably, for normal metal-forming operations, is between 700 and 800 inches per second.

In smaller machines, such as, for example, a machine having a ten inch stroke for each of the platens 2 and 3, the acceleration of each of the platens may be in the nature of 60 $g$, or more, to attain the desired velocity at impact. On the other hand, in larger machines, such as, for example, a machine having a thirty inch stroke for each of the platens 2 and 3, the acceleration of each of the platens may be in the nature of 30 $g$, or less, to attain the same desired velocity at impact. In some instances, such as, for example, in machines of the aforementioned nature having the higher rates of acceleration, it may be desired to embody a metering pin arrangement such as that shown in FIG. 6 to slow the initial acceleration of the platens 2 and 3 during release of the latches 52–55, whereas, in other machines, wherein the platen acceleration is slower it may be desired not to have such a metering pin arrangement. In either event, in the preferred form of the present invention, the free end of each of the drive pistons 12 and 13 disposed in the respective drive cylinders 8 and 9 is subject to the full pressure of gas in the respective drive cylinder 8 or 9, such free ends being spaced from all other adjacent structures, whether they be metering pins, such as the metering pins 46, or the adjacent ends of the cylinder walls, such as the ends 39.

It will be remembered that in the machine 1 shown in the drawings, wherein a metering pin 46, FIG. 6, is mounted in each of the drive cylinders 8 and 9, the metering pin 46 is spaced radially and axially from the end of the respective drive piston 12 or 13 in which it is disposed when the platens 2 and 3 are in fully retracted position. The spacing is relatively close, such as, for example, in the nature of ten-thousandths of an inch, so that, if the metering pins 46 project into the adjacent pistons 12 and 13 a quarter of an inch, during substantially the first quarter of an inch travel of the platens 2 and 3 toward actuated position, the inner ends of the recesses 45 in each of the pistons 12 and 13 are not subjected to the full pressure of the gas in the respective drive cylinders 8 and 9, the flow of gas between the sides of the adjacent metering pins 46 and the collars 41 on the pistons 12 and 13 being retarded sufficiently that it is insufficient to maintain the full pressure in the increasing volume between ends of the metering pins and the respective adjacent pistons 12 and 13. Such throttling of the effective gas pressure on the drive pistons 12 and 13 during the initial movement thereof toward actuated position is effective to slow the initial acceleration of the platens 2 and 3 and thereby enable effective withdrawal of the plungers 57 of the latches 52–55 to be effected at a slower rate than would be otherwise possible. While such throttling of the gas is one specific aspect of the present invention, it will be appreciated that it forms no part of the broader aspects of the present invention, and machines may be constructed which do not afford such throttling, or which do not embody metering pins such as the pins 46, without departing from the purview of the present invention.

Again referring to the cycle of operation of the machine 1, which was hereinbefore being discussed, it will be remembered that if the machine is to be manually fired, rather than automatically fired, as previously described, the control switch CS is disposed in "manual" operation position wherein it is in fully raised position, as shown in FIG. 7. With the control switch CS disposed in such position, after the pressure switch PS–1 has been closed by the aforementioned build up of pressure on the outside of the floats 32 and 33 in the respective float cylinders 26 and 27, the push button switch PB–2 in circuits 128 and 130 may be manually operated to thereby open its contacts in the circuits 128 and close its contacts in the circuit 130. The closing of the contacts of the push button switch PB–2 in the circuit 130 energizes the relay R–2 in the circuit 132, the circuit for so energizing the relay R–2 extending from the power line 124 through the circuits 130 and 132 to the power line 125.

Energization of the relay R–2 opens the normally closed relay contacts CR–2 in the circuit 129 to thereby de-energize the solenoid valve SV–3 by breaking the connection between the circuits 130 and 128 through the circuit 129. The de-energization of the solenoid valve SV–3 causes the hydraulic pump 72 to be sealed from the poppet valve 9 and the latches 52–55, as previously described in connection with the automatic firing of the machine 1.

The energization of the relay R–2 also closes the normally open relay contact CR–2' in the circuit 130 to thereby energize the solenoid valve SV–4. The energization of solenoid valve SV–4 opens it to thereby open the poppet valve 82 to sump through the hydraulic lines 81 and 83, the solenoid valve SV–4 and the hydraulic line 84. It will be remembered that the opening of the poppet valve 82 drains the outer ends of the latches 52–55 through the hydraulic lines 106 and 107 and the poppet valve 82 to sump. The gas pressure in the front end portions and the latches 52–55 then retracts the plungers 57 therein, to thereby release the platens 2 and 3 so that the machine 1 fires, the platens 2 and 3 coming together in a work-forming operation. The operator may then release the push button switch PB–1 to thereby permit it to return to fully raised position as shown in FIG. 7, and this completes the manual firing operation of the machine 1.

Completion of the cycle of operation of the machine 1 is accomplished by the releasing of the push button switch PB–1, and thereby permitting it to open, whether the firing of the machine 1 has been accomplished automatically or manually. Releasing of the push button switch PB–1 de-energizes the relay R–1 in the circuit 135 by opening the circuit 134 through which the circuit 135 is connected to the power line 124. De-energization of the relay R–1 opens the normally open relay contacts CR–1" in the circuit 130. Opening of the relay contacts CR–1" de-energizes the solenoid valve SV–4 which closes the connection between the hydraulic lines 81 and 83 to the hydraulic line 84 and thereby seals the upper end of the poppet valve 82 from sump. However, the sealing of the upper end of poppet valve 82 from sump is immaterial at this time because the poppet valve remains open, solenoid valve SV–3 being de-energized, so that hydraulic fluid does not flow from the pump 72 to the poppet valve 82, and, therefore, the latches 52–55 may still drain to sump through the poppet valve 82.

The opening of the relay contacts CR–1" also insures that solenoid valve SV–3 remains de-energized, even if push button PB–2 is released in a manual firing of the machine 1. This maintains a seal between the hydraulic pump 72, and the poppet valve 82 and latches 52–55 so as to prevent forward movement of the plungers 57 in the latches 52 and 55. Opening of the relay contacts CR–1" also insures de-energization of the relay R–2 in the circuit 132.

De-energization of the relay R–1 also causes the normally closed relay contacts CR–1 in circuit 138 to close, and thereby causes energization of the solenoid valve SV–7. Energization of the solenoid valve SV–7 opens the connection of the hydraulic line 98 and, therefore, the hydraulic lines 99 and 97 to sump through valve 87, to thereby open the outer ends of the float cylinders 26 and 27 of the return mechanisms 4 and 5 to sump.

De-energization of the relay R–1 also causes the normally closed relay contact CR–1' in circuit 127 to close and thereby energize the solenoid valve SV–1. The energization of the solenoid valve SV–1 again charges the machine 1. That is, it again causes hydraulic fluid to be fed from the hydraulic line 73 through valve 74 to the pilots 88–P and 90–P to thereby open the check valves 88 and 90, and feed hydraulic fluid from the pump 72 through the hydraulic line 73, the check valves 88 and 90, and the hydraulic lines 89 and 91 to the inner ends of the float cylinders 26 and 27 of the return mechanisms 4 and 5, to thereby move the platens 2 and 3 into fully retracted position, as previously described in connection with the initiation of a cycle of operation of the machine 1.

The aforementioned releasing of the push button switch PB–1 also de-energizes the solenoid valve SV–2 in the circuit 123 by opening the circuit 134 connected thereto. De-energization of the solenoid valve SV–2 causes the check valves 93 and 94 to close by causing the valve 74 to seal the pilots 93–P and 94–P, respectively, from the hydraulic line 73 connected to the pump 72, and connecting the pilots 93–P and 94–P to sump through the hydraulic lines 96 and 95 and the valve 74. This closes the drain to sump from the inner ends of the float cylinders 26 and 27 of the return mechanisms 4 and 5 through hydraulic lines 89 and 91, and the check valves 93 and 94, respectively.

The aforementioned release of the push button switch PB–1 also de-energizes the solenoid valve SV–8 in circuit 134. The de-energization of the solenoid valve SV–8 closes the connection of the hydraulic line 98, and, therefore, the hydraulic lines 99 and 97, through the valve 87 to the hydraulic lines 86 and 73 and the pump 72, to thereby seal the outer ends of the float cylinders 26 and 27 of the return mechanisms 4 and 5 from the hydraulic pump 72. This completes a cycle of operation of machine 1, and the machine 1 is now in condition for initiation of a new cycle of operation by again manually closing the push button switch PB–1, as previously described. The machine 1, at this time, is also in condition for shutting down.

At this time, the latches of the machine 1 are not engaged with the platens 2 and 3 because the push button switch PB–1 is not closed. Therefore, in a shutting down operation, the platens 2 and 3 may be moved together so as to insure that they will not be accidentally fired, the movement of the platens 2 and 3 together during a shut-down operation being relatively slow and gentle.

In such a shut down operation, the selector switch SS may be moved from the "run" position in which it is disposed during operation of the machine 1 to the "shut down" position shown in FIG. 7. This actuation of the selector switch SS de-energizes solenoid valve SV–1 by opening the circuit 127. The de-energization of the solenoid valve SV–1 causes the check valves 88 and 90 to close by causing the valve 74 to close communication between the hydraulic line 73 and the pilots 88–P and 90–P, respectively. Closing of the check valves 88 and 90 closes the connection between the hydraulic pump 72 and the hydraulic lines 89 and 91 to thereby seal the inner ends of the float cylinders 26 and 27 of the return mechanisms 4 and 5, respectively, from the hydraulic pump 72.

Movement of the selector switch SS to "shut down" position also energizes relay R–2 by closing the circuit thereto through the circuit 132. Energization of the relay R–2 causes the the normally open relay contacts CR–2' in circuit 130 to close to thereby energize the solenoid valve SV–4, the circuit for the energization of solenoid valve SV–4 extending from the power line 124 through circuit 132 and the circuit 130 to the power line 125. Energization of the solenoid valve SV–4 insures that the latches 52–55 are retracted, and will remain retracted, by opening the connection of the upper end of the poppet valve 82 to sump through hydraulic lines 81 and 83, the valve SV–4, and the hydraulic line 84.

The aforementioned movement of the selector switch SS to "shut down" position also energizes the solenoid valve SV–5 in circuit 136. Energization of the solenoid valve SV–5 opens the hydraulic line 91 therethrough to sump thereby bleeding hydraulic fluid to sump from the inside ends of the float cylinders 26 and 27 of the lower return mechanism 5, and thereby permit the platen 3 to move upwardly toward the platen 2 by reason of the gas pressure in the drive cylinders 8 and 9 of the lower drive mechanism 7. The bleeding of the hydraulic fluid in the lower float cylinders 26 and 27 through the solenoid valve SV–5 is at a sufficiently slow rate of speed that the platen 3 moves relatively slowly toward the platen 2 in this operation.

The aforementioned movement of the selector switch SS to "shut down" position also energizes the solenoid valve SV–6 in circuit 137, the circuit for doing this extending from the power line 124 through circuit 136 and the circuit 137 to the power line 125. Energization of the solenoid valve SV–6 connects the hydraulic line 89 through the valve SV–6 to sump, and thereby bleeds hydraulic fluid to sump from the inside ends of the float cylinders 26 and 27 of the upper return mechanism 4. This bleeding of the hydraulic fluid from the lower ends of the upper float cylinders 26 and 27 permits the platen 2 to move downwardly toward the platen 3, the gas pressure in the drive cylinders 8 and 9 of the upper drive mechanism 6 effecting this downward movement of the platen 2. As was true with respect to the platen 3, the bleeding of hydraulic fluid from the upper drive cylinders 26 and 27 to sump through the solenoid valve 26 is at a sufficiently slow rate of speed that the platen 2 moves relatively slowly downwardly toward the platen 3.

This completes a shutting down operation of the machine 1, and it will be seen that in such "shut down" position the platens 2 and 3 are disposed in actuated position so as to insure against accidental firing of the machine 1 during "shut down" condition. When the machine 1 is in "shut down" condition and it is again desired to initiate a cycle of operation of the machine 1, the selector switch SS again may be moved from the "shut down" to the "run" position and the subsequent cycle of operation proceeds in the same manner as heretofore discussed with respect to the initial cycle of operation, after such movement of the selector switch SS to "run" position.

If during operation of the machine 1, after a cycle of operation thereof has been completed, it is desired to initiate a new cycle of operation, rather than to shut down the machine 1, the push button switch PB–1 may again be manually closed and held in that position, and the new cycle of operation proceeds in the same manner as heretofore described with respect to the initial cycle of operation of the machine, after closing of the push button switch 1 in that cycle of operation.

With the machine 1 constructed in the manner disclosed herein, if it is desired to inch the platens 2 and 3 toward or away from each other, this may be readily accomplished at the point in any cycle or operation wherein the next step would otherwise be the cosing of the push button switch PB–1. It will be remembered that at this point in a cycle of operation, the selector switch SS is disposed in "run" position so that the solenoid valves SV–6 and SV–5 are de-energized to thereby close the connection to sump therethrough from the hydraulic lines 91 and 89, respectively, and the solenoid valve SV–1 has been energized to thereby connect the hydraulic pump 72 to the inner ends of the float cylinders 26 and 27 of the return mechanisms 4 and 5, so that the platens 2 and 3 have been moved apart into fully actuated position. However, at this point in a cycle of operation the latches 52 and 55 have not as yet been engaged because the push button switch PB–1 has not been closed. Therefore, at this point in a cycle operation on the machine, the platens 2 and 3 may be inched toward and away from each other if it is desired to do so, as will now be described.

Such an inching operation may be accomplished by first moving the selector switch SS from the "run" to the "inch" position shown in FG. 7. This movement of the selector switch SS to "inch" position de-energizes the solenoid valve SV–1 by opening the circuit 127, to thereby seal close the connection of the hydraulic pump 72 to the float cylinders 26 and 27 of the return mechanisms 4 and 5, through the check valves 88 and 90.

Movement of the selector switch SS to the aforementioned "inch" position also energizes the relay R–2, by closing the circuit therethrough from the power line 124, through circuit 133, the circuit 132 and the circuit 130 to the power line 125. Energization of the solenoid valve SV–4 opens the connection therethrough to sump from the upper end of the poppet valve 82 through hydraulic lines 81, 83, and 84, to thereby insure that the latches 52–55 remain in retracted position.

With the machine 1 in this condition, the platens 2 and 3 may be selectively inched upwardly and downwardly by selective actuation of the valves 114, 117, 119 and 122. For example, if it is desired to inch the lower platen 3 upwardly, this may be accomplished by opening the valve 122. Such opening of the valve 122 permits hydraulic fluid to flow from the inner ends of the lower float cylinders 26 and 27 through hydraulic lines 91 and 121, the valve 122 and the hydraulic line 120 to sump, so that the gas pressure in the lower drive cylinders 8 and 9 is effective to raise the platen 3.

If it is desired subsequently to inch the lower platen 3 downwardly, the valve 122 may be closed and the valve 117 opened. Opening of the valve 117 connects the inner ends of the lower drive cylinders 26 and 27 to the hydraulic pump 72 through hydraulic lines 91 and 116, the valve 117 and the hydraulic line 150 to thereby increase the hydraulic pressure on the upper face of the floats 32 and 33 in the lower float cylinders 26 and 27 and thereby cause the platen 3 to move downwardly against the urging of the gas in the drive cylinders 8 and 9 of the lower drive mechanism 7.

Similarly, inching of the upper platen 2 downwardly and upwardly may be accomplished by selectively opening the valves 119 and 114, respectively. Opening of the valve 119 connects the lower ends of the upper float cylinders 26 and 27 to sump through hydraulic lines 89 and 118, the valve 119 and the hydraulic line 120 to thereby permit the platen 2 to move downwardly; and opening of the valve 114 connects the lower ends of the upper float cylinders 26 and 27 to the hydraulic pump 72 through hydraulic lines 115 and 113, the valve 114, and the hydraulic lines 89 to thereby force the platen 2 upwardly against the urging of the gas in the drive cylinders 8 and 9 of the upper drive mechanism 6.

Upon the completion of the inching operation, all of the valves 114, 117, 119, and 122 are closed, and the machine 1 may be conditioned for a "run" or a "shut down" operation by moving the selector switch SS to either "run" or "shut down" position, respectively. A "run" operation of the machine 1 will occur when the selector switch is in "run" position, when the push button switch PB-1 is manually closed, as previously described. A "shut down" operation of the machine 1 will automatically occur, as previously described, upon the movement of the selector switch SS from "inch" position to "shut down" position.

From the foregoing it will be seen that the present invention affords a novel high enery rate machine wherein the drive mechanism thereof may be held in, and released from, cocked or retracted position in a novel and expeditious manner.

Also, it will be seen that the present invention affords a novel latching mechanism for high energy rate machines, and the like, and that release of the latches is effected in accordance with a novel principle of operation.

In addition, it will be seen that the present invention affords a novel high energy rate machine which does not require the engagement of the drive pistons thereof with seals for sealing portions of the drive pistons from the gas pressure in the drive cylinders when the drive pistons are being held in retracted position.

Also, it will be seen that the present invention affords a novel high energy rate machine which may embody a plurality of drive cylinders for each ram to be driven, without the necessity of having to feed gas into the plurality of cylinders or into a plurality of sealed areas in a balanced manner in order to effect a balanced driving of the ram.

In addition, it will be seen that in a machine constructed in accordance with the principles of the present invention, if one of the latches holding a platen should be somewhat slower in retracting than the other latches holding the platen, additional force would be placed on the one latch by the platen, thereby tending to afford additional acceleration for the one latch, so that the latching mechanism tends to be self-compensating in its releasing operations.

Also, it will be seen that the present invention affords a novel high energy rate machine wherein the drive cylinders thereof are stationary and are not subject to impact, so that they can be made of seamless steel tubing, or the like, rather than being made of tool steel, as has been common in high energy rate machines heretofore known in the art.

In addition, it will be seen that the present invention affords a novel high energy rate machine wherein the platens thereof do not require the elaborate coring and machining which has been common in the platens of high energy rate machines heretofore known in the art, thus eliminating substantial manufacturing expenses and undesirable weakening of the platens.

In addition it will be seen that the present invention affords a novel high energy rate machine, and a novel latching mechanism for such machines, which are practical and efficient in operation and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. An actuator comprising
 (a) a cylinder,
 (b) a ram having an end portion
  (1) disposed in said cylinder in radially spaced relation thereto, and
  (2) reciprocable between one position and another position therein,
 (c) pressurized fluid in said cylinder,
  (1) in surrounding relation to said end portion, and
  (2) urging said ram toward said other position in all positions of said end portion in said cylinder,
 (d) means releasably engageable with said ram for holding said ram in said one position, and
 (e) means for disengaging said first mentioned means from said ram to thereby free said ram for movement by said fluid from said one position toward said other position,
 (f) said means releasably engageable with said ram comprising
  (1) an elongated plunger having
   (a') a beveled end portion
    (1') disposed at an acute angle to the length of said plunger, and
    (2') engaged with a complementary surface on said ram when said first mentioned means are so releasably engaged with said ram, and
 (j) said second mentioned means including
  (1) means for feeding hydraulic fluid into enengagement with said plunger in position to hold the latter in said engagement with said complementary surface, and
  (2) means for discharging said fluid from said plunger to thereby release said plunger from said engagement with said complementary surface.
2. An actuator as defined in claim 1, and in which
 (a) said hydraulic fluid exerts in excess of 2000 pounds per square inch pressure on said plunger toward said ram when said plunger is disposed in said engagement with said complementary surface.
3. An actuator as defined in claim 1, and in which
 (a) said hydraulic fluid exerts not substantially less than 3000 pounds per square inch pressure on said plunger toward said ram when said plunger is disposed in said engagement with said complementary surface.

4. An actuator comprising
 (a) a cylinder,
 (b) a ram having an end portion
  (1) disposed in said cylinder in radially spaced relation thereto, and
  (2) reciprocable between one position and another position therein,
 (c) pressurized fluid in said cylinder
  (1) in surrounding relation to said end portion, and
  (2) urging said ram toward said other position in all positions of said end portion in said cylinder,
 (d) means releasably engageable with said ram for holding said ram in said one position,
 (e) means for disengaging said first mentioned means from said ram to thereby free said ram for movement by said fluid from said one position toward said other position,
 (f) cylinder means disposed in substantially parallel relation to said cylinder,
 (g) piston means
  (1) reciprocably mounted in said cylinder means in substantially parallel relation to said end portion of said ram, and
  (2) operatively connected to said ram for movement therewith, and
 (h) means for feeding pressurized fluid against said piston means when said end portion is disposed out of said one position to thereby move said end portion into said one position against the urging of said first mentioned fluid.
5. An actuator as defined in claim 4, and
 (a) in which
  (1) said piston means includes a float means reciprocable in said cylinder means independently of the remainder of said piston means, and (2) said second mentioned fluid in said cylinder means urges said float means to move in one direction in said cylinder means, and (b) which includes (1) means for moving said float means in said cylinder means and relative to said remainder of said piston means, in the direction opposite to said first mentioned direction, to thereby discharge said second mentioned fluid from said cylinder means when said first mentioned means is so releasably engaged with said ram.

6. An actuator comprising (a) an elongated cylinder having
   (1) a head end and
   (2) another end, (b) a ram
   (1) reciprocably mounted in said cylinder and
   (2) having an end portion reciprocable between
     (a′) one position and
     (b′) another position in said cylinder, (c) said end portion
   (1) being disposed a greater distance from said head end in said other position than in said one position, and
   (2) having an end face facing toward said head end, (d) pressurized fluid in said cylinder and urging said ram to move away from said head end in all positions of said end portion, (e) said end portion being movable through said fluid between said one and other positions, and (f) means releasably engageable with said ram for releasably holding said ram against the urging of said fluid when said end portion is disposed in said one position, (g) said end face being disposed in spaced relation to said head end when said end portion is disposed in said one position.

7. An actuator comprising (a) an elongated cylinder having
   (1) a head end and
   (2) another end, (b) a ram
   (1) reciprocably mounted in said cylinder and
   (2) having an end portion reciprocable between
     (a′) one position and
     (b′) another position in said cylinder, (c) said end portion
   (1) being disposed a greater distance from said head end in said other position than in said one position, and
   (2) having an end face facing toward said head end, (d) pressurized fluid in said cylinder and urging said ram to move away from said head end in all positions of said end portion, (e) said end portion being movable through said fluid between said one and other positions, and (f) means releasably engageable with said ram for releasably holding said ram against the urging of said fluid when said end portion is disposed in said one position, (g) said end face having a recess disposed therein in inwardly spaced relation to the outer periphery thereof, (h) elongated means projecting from said head end toward said ram, and (i) said elongated means extending into said recess when said end portion is disposed in said one position to thereby restrict the force exerted by said fluid on said end face during initial movement of said end portion from said one position toward said other position.

8. An actuator comprising (a) an elongated cylinder having
   (1) a head end and
   (2) another end, (b) a ram
   (1) reciprocably mounted in said cylinder and
   (2) having an end portion reciprocable between
     (a′) one position and
     (b′) another position in said cylinder, (c) said end portion
   (1) being disposed a greater distance from said head end in said other position than in said one position, and
   (2) having an end face facing toward said head end, (d) pressurized fluid in said cylinder and urging said ram to move away from said head end in all positions of said end portion, (e) said end portion being movable through said fluid between said one and other positions, and (f) means releasably engageable with said ram for releasably holding said ram against the urging of said fluid when said end portion is disposed in said one position, (g) said means comprising
   (1) a housing,
   (2) a plunger reciprocable out of and into said housing between
     (a′) latching engagement with and
     (b′) disenagement from said ram, respectively, and
   (3) means for feeding fluid into position to urge said plunger toward said latching engagement.

9. An actuator as defined in claim 8, and (a) which includes
   (1) means for feeding expansible fluid into engagement with said plunger in position to urge said plunger toward said disengagement, and
   (2) means for discharging said second mentioned fluid from said position to thereby release said plunger and (b) which includes
   (1) expansible fluid in position to urge said plunger toward said disengagement, and (c) in which
   (1) said ram and said expansible fluid urge said plunger toward said disengagement against said urging of said second mentioned fluid with in excess of 2000 pounds per square inch pressure when said plunger is disposed in said latching engagement.

10. An actuator as defined in claim 8 and (a) in which
   (1) said plunger has an enlarged portion disposed in said housing,
   (2) said ram has an abutment surface disposed at an acute angle to the path of reciprocation thereof,
   (3) said plunger has a beveled surface on one end thereof disposed at an acute angle to the path of reciprocation of said plunger and to said first mentioned path of reciprocation,
   (4) said surfaces are disposed in abutting juxtaposition to each other when said plunger is disposed in said latching engagement, and
   (5) said fluid is disposed in said housing in engagement with one side of said enlarged portion when said fluid is disposed in said position thereof, and (b) which includes
   (1) expansible fluid in said housing
     (a′) on the side of said enlarged portion remote from said one side thereof, and
     (b′) urging said plunger toward said disengagement against the urging of said first mentioned fluid, and
(c) in which
(1) said ram and said expansible fluid urge said plunger toward said disengagement against said first mentioned fluid with a combined force effective to maintain a pressure of in excess of 2000 pounds per square inch in said first mentioned fluid when said plunger is disposed in said latching engagement.

11. An actuator as defined in claim 10, and in which
(a) the pressure of said expansible fluid is not substantially less than 1000 pounds per square inch.

12. An actuator as defined in claim 10, and in which
(a) the pressure of said expansible fluid is such as to be effective, by itself, to maintain a pressure on said first mentioned fluid in excess of 2000 pounds per square inch when said plunger is disposed in said latching engagement.

13. A high energy rate machine comprising
(a) a supporting frame,
(b) two platens reciprocable toward and away from each other along a path of movement in said frame,
(c) elongated cylinder means disposed on said frame on the sides of respective ones of said platens remote from the other platen in parallel relation to said path of movement,
(d) piston means
(1) reciprocably mounted in respective ones of said cylinders and
(2) operatively connected to the adjacent one of said platens for movement therewith,
(e) said piston means having end portions
(1) disposed in said respective cylinder means, and
(2) reciprocable therein between a cocked position and an actuated position,
(f) pressurized gas in said cylinder means for driving said end portions from said cocked positions to said actuated positions
(g) latching means releasably engageable with said platens for holding said end portions in said cocked positions, and
(h) means for disengaging said latching means from said platens for releasing said end portions for movement from said cocked positions to said actuated positions,
(i) said end portions
(1) being movable through said gas between said cocked and actuated positions, and
(2) each having end faces engaged by said gas at all times for driving said end portions from said cocked position and thereby move said platens together upon disengagement of said latching means from said platens when said end portions are disposed in said cocked positions.

14. A high energy rate machine as defined in claim 13, and which includes
(a) means for moving said end portion from said actuated positions to said cocked position against the urging of said gas.

15. A high energy rate machine as defined in claim 14, and in which
(a) said latching means comprises
(1) housing means
(2) a plunger means reciprocable in said housing between
(a') one position wherein said plunger means are latchingly engaged with said platens, and
(b') another position wherein said plunger means are disengaged from said platens, and
(3) means for applying hydraulic fluid pressure to said plunger means in position within said housing means effective to hold said plunger in said one position, and
(b) said means for disengaging said latching means comprises
(1) means for releasing said hydraulic fluid pressure from said plunger means, and
(2) expansible gas in said housing means and applying pressure to said plunger means effective to move said plunger means to said other other position upon said release of said hydraulic fluid pressure.

16. A high energy rate machine as defined in claim 14, and
(a) in which
(1) said means for moving said end portions comprises
(a') other cylinder means disposed on said frame in substantially parallel relation to respective ones of said first mentioned cylinder means,
(b') other piston means
(1') reciprocably mounted in respective ones of said other cylinder means for movement therein between
(a'') one position and
(b'') another position, and
(2') operatively connected to said platens and movable therewith, and
(c') means for feeding hydraulic fluid into said other cylinder means,
(2) each of said other piston means comprises
(a') an elongated piston
(1') operatively connected to one of said platens, and
(2') having an enlarged free end portion disposed in a respective one of said other cylinder means, and
(b') a float reciprocably mounted on said piston in surrounding relation thereto inwardly of said free end portion,
(3) said other piston means
(a') are effective to move said first mentioned end portions to cocked position upon movement to said one position, and
(b') are driven by said first mentioned end portions to said other position upon movement of said first mentioned end portions to said other position upon movement of said first mentioned end portions to said actuated positions, and
(4) said means for feeding hydraulic fluid are effective to feed hydraulic fluid into said other cylinder means against said floats on the sides thereof remote from said enlarged free end portions to thereby move said other piston means to said one position, and
(b) which includes
(1) means for discharging said hydraulic fluid from said cylinder means, and
(2) means for feeding other hydraulic fluid into said cylinder means past said enlarged free end portions against said floats to thereby move said floats away from said enlarged free end portions and force said first mentioned hydraulic fluid from said cylinder means.

17. A high energy rate machine as defined in claim 16, and in which
(a) said latching means comprises
(1) housing means
(2) a plunger means reciprocable in said housing between
(a') one position wherein said plunger means are latchingly engaged with said platens, and (b') another position wherein said plunger means are disengaged from said platens, and
(3) means for applying hydraulic fluid presure to said plunger means in position within said housing means effective to hold said plunger in said one position, and
(b) said means for disengaging said latching means comprises
(1) means for releasing said hydraulic fluid pressure from said plunger means, and
(2) expansible gas in said housing means and applying pressure to said plunger means effective to move said plunger means to said other position upon said release of said hydraulic fluid pressure.

18. A high energy rate machine as defined in claim 17, and in which (a) the pressure of said hydraulic fluid in said housing means when said plunger means are disposed in said one position is in excess of 2000 pounds per square inch.

References Cited
UNITED STATES PATENTS

| | | | |
|---|---|---|---|
| 3,108,503 | 10/1963 | Murek | 72—453 |
| 3,145,648 | 8/1964 | Murek | 100—269 |
| 3,158,048 | 11/1964 | Bollar | 72—453 |
| 3,187,548 | 6/1965 | Murek | 72—453 |
| 3,189,954 | 6/1965 | Piet | 72—453 |

CHARLES W. LANHAM, Primary Examiner

G. P. CROSBY, Assistant Examiner

U.S. Cl. X.R.

72—453; 100—264, 269